3,119,893
FOUR MEMBER TELEPHOTO OBJECTIVE

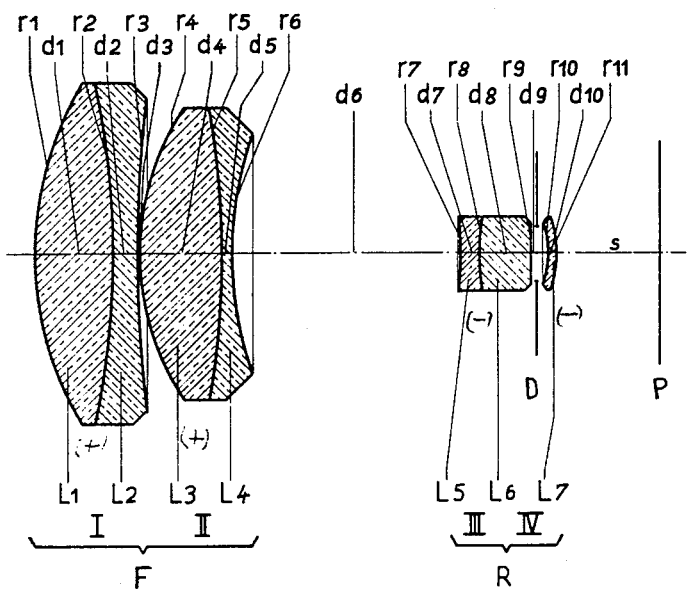

Wolfram Albrecht, Kreuznach, Rhineland, and Werner Wagner, Odernheim (Glan), Germany, assignors to Jos. Schneider & Co., Kreuznach, Rhineland, Germany, a corporation of Germany
Filed Jan. 23, 1961, Ser. No. 84,089
Claims priority, application Germany Feb. 3, 1960
2 Claims. (Cl. 88—57)

Our present invention relates to an optical objective of large focal length for photographic or cinematographic cameras.

This application is a continuation in part of our application Ser. No. 64,194, filed October 21, 1960.

Such objectives, known as telephoto objectives, are frequently used with cameras having a fixedly positioned shutter and, in such cases, are known to comprise a negative rear component forming a relatively small exit pupil directly ahead of the shutter, this rear component also including a diaphragm between two of its members, in combination with a positive front component which forms a relatively large entrance pupil for the incident longer light rays on the object side of the system and is separated from the rear component by a large air space.

In our co-pending application Ser. No. 64,194, filed October 21, 1960, we have disclosed a telephoto objective of this character having a larger relative aperture and an increased focal length (e.g. at least 4 times the image diagonal) in comparison with similar objectives of the prior art, this being realized by the use of two air-spaced positive menisci in its front component, both of them turning their convex surfaces to the side of the longer light rays, and two air-spaced negative members in the rear component (of which preferably at least one is also a meniscus) each turning a concave surface toward the front component, the four members of the two components having individual focal lengths $f_I$, $f_{II}$, $f_{III}$, $f_{IV}$ related to the overall focal length $f$ of the system by the expression (a) $1.5f > f_I > f_{II} > 0.8f$
(b) $f > -f_{III} \geq -f_{IV} > 0.4f$ it was also established that, for the purpose of suppressing residual aberrations, it was desirable to let the total axial length of the front component be greater than 0.8 times the air space separating the two components but less than 25% of the overall focal length $f$. In a preferred embodiment the two positive menisci constituting the front component, of which advantageously at least one was designed as a doublet, were shown so proportioned that the radius of the convex forward surface of the first meniscus of that component was greater than $0.3f$ but less than twice the radius of the corresponding surface of the second meniscus thereof. The associated rear component consisted of two negatively refracting members of which the more forward one was a doublet with a cemented surface turning its concavity toward the image plane of the system.

The general object of our present invention is to provide an improved system of the character just described which is more compact and of lighter weight, particularly in its front component, without any impairment of its optical qualities.

This object is realized, in accordance with the instant invention, by a relative increase of the relative focal lengths $f_{II}$ and $f_{IV}$ of the second and fourth members so that their absolute values will be greater than those of the focal lengths $f_I$ and $f_{III}$ of the first and third members, respectively, in accordance with the following inequalities:

(a') $1.5f > f_I > 0.7f_{II} > 0.8f$
(b') $f > -f_{III} > -0.55f_{IV} > 0.4f$

Another feature of the invention, useful from the viewpoint of realizing the aforestated object, resides in the use of glasses having refractive indices below 1.60 for the $d$ line of the spectrum in both lens elements of the doublet constituting the forward member of the front component. A further feature, with the same object in view, involves a dimensioning of the first lens element of this doublet so as to have its axial thickness below 8% of the overall focal length $f$ while the axial thickness of the lens element cemented to it is less than 3% of that focal length; the total axial thickness of the first member will then be substantially the same as that of the second member of the front component which, preferably, is also a doublet.

The invention will be described in greater detail with reference to the accompanying drawing, the sole figure of which schematically illustrates a preferred embodiment.

The system shown in the drawing comprises a front component F, consisting of two positive menisci I and II separated by a large air space $d_6$ from a rear component R of a negative doublet III and a negative singlet IV. The first member I is a doublet composed of a biconvex lens $L_1$, with radii $r_1$, $r_2$ and thickness $d_1$, cemented onto a biconcave lens $L_2$ with radii $r_2$, $r_3$ and thickness $d_2$. The second member II, separated from member I by an air space $d_3$, consists of a biconvex lens $L_3$ radii $r_4$, $r_5$ and thickness $d_4$) cemented onto a biconcave lens $L_4$ (radii $r_5$, $r_6$, thickness $d_5$). The third member III is a negative meniscus composed of a biconcave lens $L_5$ (radii $r_7$, $r_8$ and thickness $d_7$) cemented onto a biconvex lens $L_6$ (radii $r_8$, $r_9$ and thickness $d_8$); separated from this member by an air space $d_9$, which includes a diaphragm D, is the fourth member IV consisting of a single negative meniscus $L_7$ with radii $r_{10}$, $r_{11}$ and thickness $d_{10}$. Lens $L_7$, which represents the exit pupil of the system, is separated by the back-focal length $s$ from the image plane P.

Representative values of the radii $r_1$ to $r_{11}$, the thicknesses and separations $d_1$ to $d_{10}$, the refractive indices $n_d$ and Abbé numbers $\nu$ of the lenses $L_1$ to $L_7$ are given in the following table, the values for $r_1$ to $r_{11}$ and $d_1$ to $d_{10}$ as well as $s$ being based upon a numerical value of 100 for the overall focal length $f$ of the system.

[Relative aperture 1:4.5. $f=100$. $s=25.77$]

| | | Radii | Thicknesses and separations | $n_d$ | $\nu$ |
|---|---|---|---|---|---|
| F | I { $L_1$ | $r_1 = +\ 33.60$ | $d_1 = 7.83$ | 1.48749 | 70.0 |
| | $L_2$ | $r_2 = -\ 83.31$ | $d_2 = 2.61$ | 1.58921 | 41.0 |
| | | $r_3 = +\ 135.82$ | $d_3 = 0.21$ | air space | |
| | II { $L_3$ | $r_4 = +\ 26.73$ | $d_4 = 8.04$ | 1.56873 | 63.1 |
| | $L_4$ | $r_5 = -\ 86.57$ | $d_5 = 1.14$ | 1.58144 | 40.8 |
| | | $r_6 = +\ 37.12$ | $d_6 = 23.46$ | air space | |
| R | III { $L_5$ | $r_7 = -\ 37.86$ | $d_7 = 2.09$ | 1.62041 | 60.3 |
| | $L_6$ | $r_8 = +\ 23.19$ | $d_8 = 5.22$ | 1.67270 | 32.2 |
| | | $r_9 = -4,166.40$ | $d_9 = 1.83$ | diaphragm space | |
| | IV $L_7$ | $r_{10} = -\ 9.78$ | $d_{10} = 0.78$ | 1.56965 | 49.5 |
| | | $r_{11} = -\ 11.67$ | | | |

The individual focal lengths of the four members I, II, III and IV in the above system are as follows:

$f_I = +105.51$; $f_{II} = +134.66$; $f_{III} = -72.12$; $f_{IV} = -124.31$

The sum $\Sigma d_F$ of the axial thicknesses and spaces $d_1$ to $d_5$ will be found to equal 19.83.

It will be seen from the foregoing table that the system specifically described and illustrated satisfies the requirements of the expressions (a') $1.5f > f_I > 0.7 f_{II} > 0.8f$
(b') $f > -f_{III} > -0.55 f_{IV} > 0.4f$ as well as the conditions (c') $2r_4 > r_1 > 0.3f$ and (d') $0.25f > \Sigma d_F > 0.8 d_6$ It will further be noted that the axial thickness $d_1$ of the forward lens element $L_1$ of the front component I has a numerical value smaller than 8, being thus less than 8% of the overall focal length $f$, and that the axial thickness $d_2$ of the lens element $L_2$ cemented to it has a numerical value smaller than 3, being thus less than 3% of that overall focal length. The combined axial thicknesses $d_1 + d_2$ and $d_4 + d_5$ of the two members I, II of front component F are substantially equal to each other.

We claim:
1. An optical telephoto objective system of overall focal length $f$, comprising four air-spaced lens members including a first, a second, a third and a fourth member of individual focal lengths $f_I$, $f_{II}$, $f_{III}$ and $f_{IV}$, respectively, said first and second members being in the shape of positive menisci and constituting a front component, said menisci turning their convex surfaces toward the side of the longer light rays, said third and fourth members being negatively refracting and constituting a rear component separated from said front component by a large air space, said third and fourth members each turning a concave surface toward said front component, said overall focal length and said individual focal lengths satisfying the relationships

$1.5f > f_I > 0.7 f_{II} > 0.8f$ and $f > -f_{III} > -0.55 f_{IV} > 0.4f$ the radius of the convex surface of said first member being less than twice the radius of the convex surface of the second member but greater than substantially 0.3 times said overall focal length, said third member being a doublet having a cemented surface turning its concavity towards the side of the shorter light rays, the total axial length of said front component being greater than substantially 0.8 times said large air space but less than substantially 25% of said overall focal length, said first member consisting of a first biconvex lens cemented onto a first biconcave lens, said second member consisting of a second biconvex lens cemented onto a second biconcave lens, said third member consisting of a third biconcave lens cemented onto a third biconvex lens, said fourth member being a meniscus-shaped singlet.

2. A system according to claim 1 wherein the radii $r_1$ to $r_{11}$ and the axial thicknesses and spacings $d_1$ to $d_{10}$ of said first biconvex lens $L_1$, said first biconcave lens $L_2$, said second biconvex lens $L_3$, said second biconcave lens $L_4$, said third biconcave lens $L_5$, said third biconvex lens $L_6$ and said singlet $L_7$, based upon a numerical value of 100 for said overall focal length $f$, their refractive indices $n_d$ and their Abbé numbers $\nu$ have numerical values substantially as given in the following table:

|  | Radii | Thicknesses and separations | $n_d$ | $\nu$ |
|---|---|---|---|---|
| $L_1$ | $r_1 = +\ 33.60$ | $d_1 = 7.83$ | 1.48749 | 70.0 |
| $L_2$ | $r_2 = -\ 83.31$ | $d_2 = 2.61$ | 1.58921 | 41.0 |
|  | $r_3 = +\ 135.82$ | $d_3 = 0.21$ | air space |  |
| $L_3$ | $r_4 = +\ 26.73$ | $d_4 = 8.04$ | 1.56873 | 63.1 |
| $L_4$ | $r_5 = -\ 86.57$ | $d_5 = 1.14$ | 1.58144 | 40.8 |
|  | $r_6 = +\ 37.12$ | $d_6 = 23.46$ | air space |  |
| $L_5$ | $r_7 = -\ 37.86$ | $d_7 = 2.09$ | 1.62041 | 60.3 |
| $L_6$ | $r_8 = +\ 23.19$ | $d_8 = 5.22$ | 1.67270 | 32.2 |
|  | $r_9 = -4,166.40$ | $d_9 = 1.83$ | diaphragm space |  |
| $L_7$ | $r_{10} = -\ 9.78$ | $d_{10} = 0.78$ | 1.56965 | 49.5 |
|  | $r_{11} = -\ 11.67$ |  |  |  |

References Cited in the file of this patent
UNITED STATES PATENTS 2,458,836 Cox _____ Jan. 11, 1949
2,715,855 Altman _____ Aug. 23, 1955